INVENTOR.
RICHARD G. LUEBBEN
BY
Knox & Knox

Jan. 5, 1965    R. G. LUEBBEN    3,164,766
HIGH VOLTAGE, NEGATIVE POLARITY, REGULATED POWER SUPPLY
Filed April 12, 1960    2 Sheets-Sheet 2
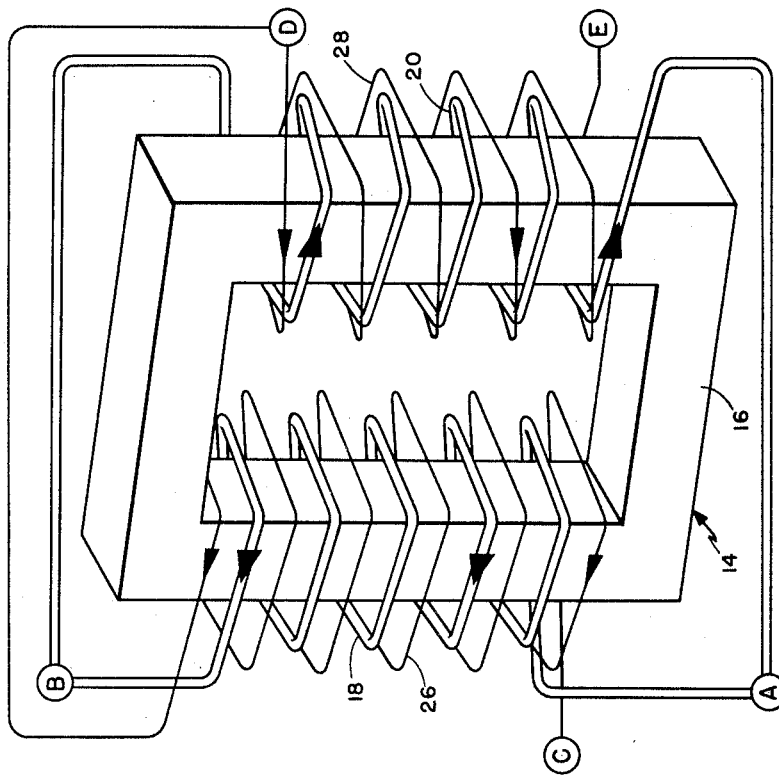
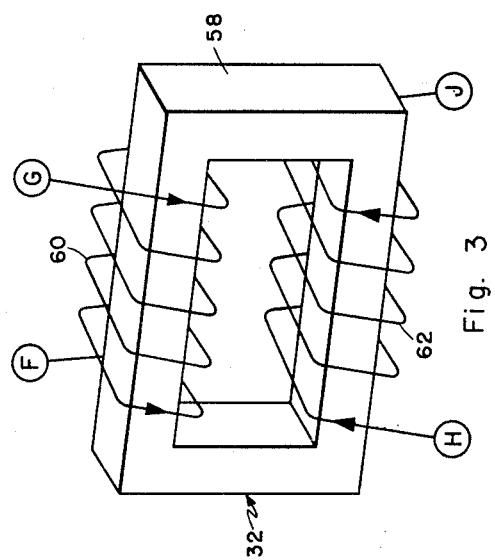
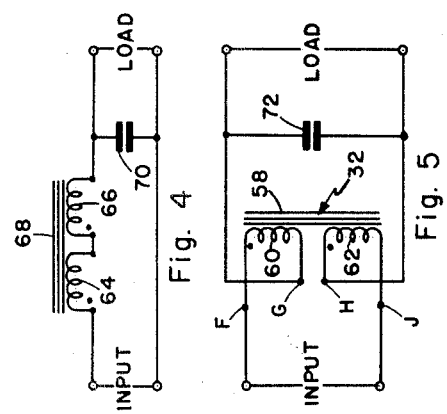
INVENTOR.
RICHARD G. LUEBBEN
BY
Knox & Knox

3,164,766
HIGH VOLTAGE, NEGATIVE POLARITY,
REGULATED POWER SUPPLY
Richard G. Luebben, San Diego, Calif., assignor to The
Ryan Aeronautical Co., San Diego, Calif.
Filed Apr. 12, 1960, Ser. No. 21,822
6 Claims. (Cl. 321—18)

The present invention relates generally to power supplies and more particularly to a high voltage, negative polarity, regulated power supply.

The primary object of this invention is to provide a power supply having a high voltage, negative polarity output with a minimum of ripple, yet without the necessity for extensive shielding around certain of the components. The circuit utilizes transformer and filter components of novel construction in a specific arrangement which balances stray capacities in the circuit, the unbalance of which causes ripple.

Another object of this invention is to provide a high voltage power supply in which a virtually ripple free output is obtained without the use of high gain feedback circuits.

A further object of this invention is to provide a power supply which is particularly suitable for use with klystrons requiring a high voltage input of negative polarity, an adaptation which necessitates the unregulated portion of the circuit to be floating, or not connected directly to ground. The stray capacities to ground inherent in such an arrangement are balanced and their effects virtually eliminated by the novel arrangement of the circuit.

Finally, it is an object to provide a high voltage power supply of the aforementioned character which is simple and convenient to assemble and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 2 is a diagrammatic view showing the arrangement of windings on the power transformer;

FIGURE 3 is a diagrammatic view showing the arrangement of windings on the filter inductance;

FIGURE 4 is a diagram of a conventional type filter circuit; and

FIGURE 5 is a diagram of a modified filter circuit as used in the present power supply.

Similar characters of reference indicate similar or identical elements and portions throughout the specification and throughout the views of the drawings.

Figure 1:
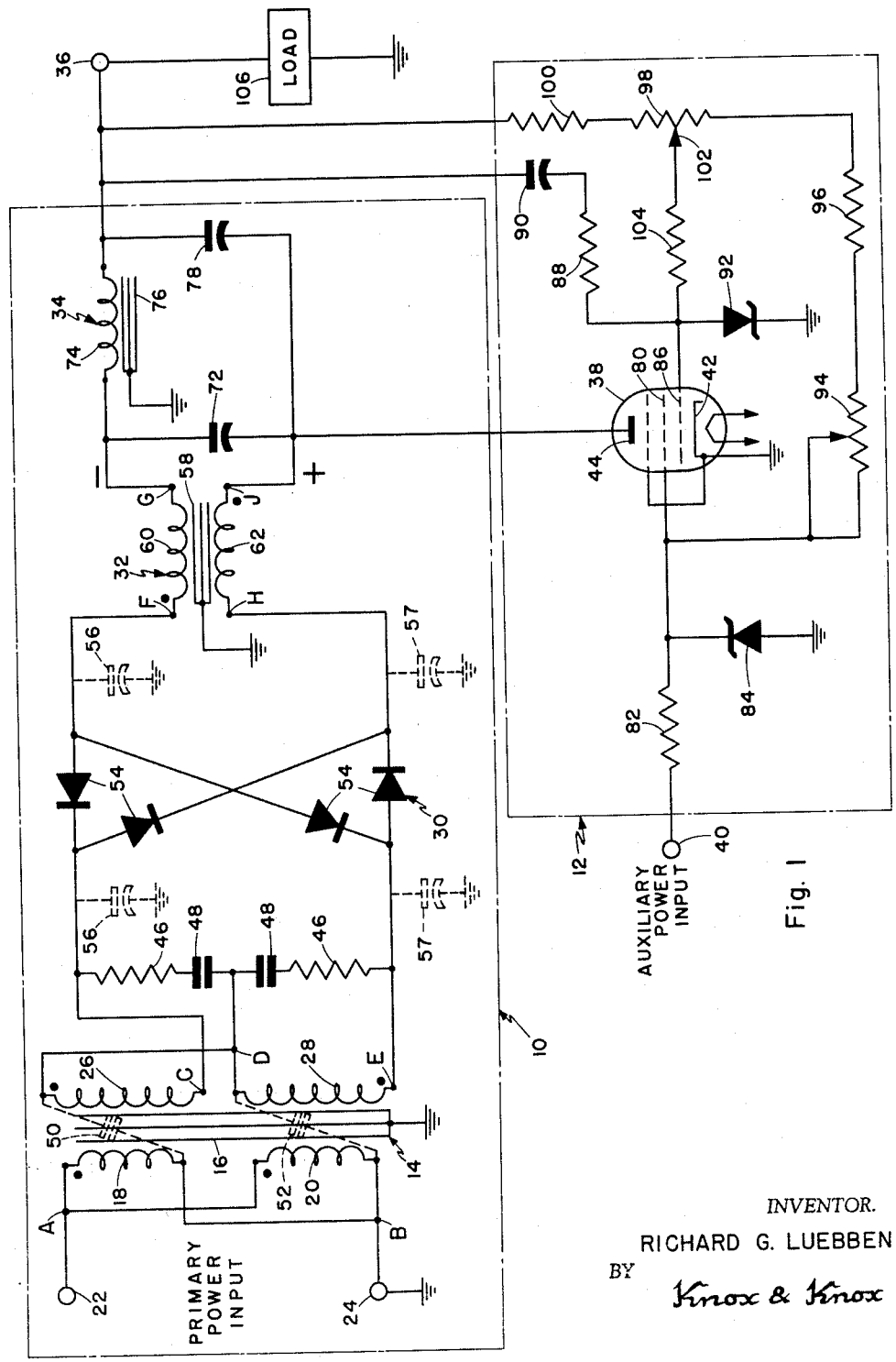
FIGURE 1 is a schematic wiring diagram of the complete power supply.

The circuit includes two basic units, a power supply 10 and a voltage regulator 12, the voltage regulator portion being, for the most part, conventional. The power supply includes a transformer 14 having a grounded core 16, a pair of primary windings 18 and 20 connected in parallel winding configuration to power input terminals 22 and 24, and a pair of secondary windings 26 and 28 connected in series aiding, the specific arrangement of the transformer being described in detail hereinafter. The transformer 14 provides a high voltage which is passed through a rectifier stage 30 a balanced filter inductance 32 and a final filter 34 to an output 36.

The voltage regulator 12 includes a tube 38 which, briefly, is coupled to the output 36 to regulate the high voltage output in accordance with a reference derived from an auxiliary power input 40. Since the high voltage output is of negative polarity, the entire power supply 10 is floating, that is, neither the positive nor negative terminal is connected to ground, in order that the voltage regulating circuit can be connected between the positive terminal and ground. In such an arrangement, the secondary windings 26 and 28, the terminals of rectifier stage 30 and input of filter inductance 32 all have stray capacities to ground, the resultant voltages appearing in the regulating circuit being coupled to the output 36 through a capacitor (hereinafter referred to as 78) and appearing as ripple in the final output. Normally, such ripple is removed by enclosing the pertinent components in a box type shield or shields, insulated from ground and connected to a point common to the anode 44 of tube 38, so that all leakage returns to the source, bypassing the output. Box type shields enclosing transformer secondary windings and filter windings are expensive, because they are not easily adaptable, fabrication wise, to production techniques and also tend to reduce reliability since they threaten dielectric strength in high voltage areas. Further, shields tend to increase size and weight and are consequently uneconomical.

Mechanical shielding can be avoided by balancing the stray capacities in the circuit. In the transformer 14 this is accomplished by a particular method of applying the windings, as illustrated in FIGURE 2, the various terminals being indicated by letters for identification with the corresponding terminals in FIGURE 1. The primary winding 18 is wound first on a coil winding mandrel, as well known in the art, the secondary winding 26 then being applied with the start of the secondary winding immediately over the finish of the primary winding and wound in the same direction, resulting in similar polarities, as indicated by the directional arrows. The separate primary winding 20 is next wound but, before applying the secondary winding 28, the mandrel is reversed, the start of said secondary winding being placed immediately over the finish of said primary winding as before. Due to the mandrel reversal, however, the polarities of windings 20 and 28 are reversed, as indicated by directional arrows, but inter-winding capacity balance is not unduly affected. The completed coils are placed on the core 16 with the primary windings 18 and 20 connected in parallel aiding arrangement to terminals A and B for connection to input terminals 22 and 24, respectively. The secondary windings 26 and 28 are connected in series between terminals C and E, their common center connection being terminal D, which is effectively the electrical center of the balanced circuit.

The two secondary windings 26 and 28 have slightly different winding capacity-leakage inductance characteristics, which must be taken into account in achieving proper balance. Since the current drawn through the transformer 14 approaches the configuration of a square wave, having steep leading and trailing edges, the harmonic energy in this type of waveform causes the secondary windings to oscillate with a damping exponent such that four to six cycles are seen. At these frequencies, usually about two decades above the input frequency, balance is difficult to achieve due to the lack of identical frequency-phase characteristics. To prevent oscillation, RC damping networks are coupled between the central terminal D and terminals C and E. The damping networks each include a resistor 46 and capacitor 48, the resistors being of equal value and chosen to produce somewhat greater than critical damping at the respective terminals, thereby eliminating oscillation. The capacitors 48 are likewise of equal value and act as frequency switches by minimizing power dissipation across the resistors 46 at the input frequency, while fully inserting the resistors for damping at the self-resonant frequency of the transformer. The inherent capacities present in the transformer 14 are indicated by hypothetical broken line capacitances 50 and 52.

The rectifier stage 30 comprises four diodes 54 arranged symmetrically with one in each side of the transformer output and the other two cross coupled across the output from terminals C and E, such an arrangement being substantially conventional. Other types of rectification may be used, the primary requirement being a symmetrical configuration to preserve balance. The inherent capacities to ground from the terminals of the rectifier stage 30 are indicated by hypothetical broken line capacitances 56 and 57, these being balanced due to the symmetrical arrangement.

The balancing of transformer 14 may be explained as follows: The potential instanteously produced between terminals C and D is equal and opposite in polarity to that produced between terminals D and E. Each of the capacitances 56 is effectively in series with the capacitance 50, while each capacitance 57 is similarly effectively in series with the capacitance 52. Thus currents will flow between terminals C and E by way of the inherent capacitances. Since these capacitances are balanced, alternating currents are contained within the susceptance paths of the balanced capacitances and do not seek additional routes to provide potential equilibrium.

The balanced filter inductance 32 has a grounded core 58 on which are two windings 60 and 62, the winding 60 having an input terminal F and an output terminal G and the winding 62 having an input terminal H and an output terminal J. As illustrated in FIGURE 3, the windings 60 and 62 are applied so that their polarities are opposed, thus balancing the capacitance of the filter. In a conventional type of filter illustrated in FIGURE 4, two windings 64 and 66 are placed in series on a core 68, the windings being in one side of the circuit, and a capacitor 70 is connected between the output end of the windings and the other side of the circuit. For comparison, the filter inductance 32 is arranged in a corresponding manner in FIGURE 5, and it can be seen that the windings 60 and 62 are connected in series aiding configuration, one in each side of the circuit, a capacitor 72 being coupled across the output ends of the windings between terminals G and J.

The negative potential from terminal G is fed through the final filter 34, which has a single winding 74 on a grounded core 76, and then to the output 36. The positive terminal J is coupled, through a capacitor 78, to the output end of winding 74.

In the voltage regulator 12, the anode 44 of the tube 38 is connected directly to the positive side of the power supply at the junction of capacitor 72 and terminal J. The screen 80 of tube 38 is connected to the input 40 through a resistor 82 and the screen potential is regulated by a zener diode 84 between said screen and ground, said diode also providing the reference for regulation of the negative high potential output. The grid 86 of tube 38 is coupled to the negative output between output 36 and filter 34 through a resistor 88 and capacitor 90 and is further connected to ground through a zener diode 92. The screen 80 is connected through resistors 94, 96, 98 and 100 in series, to the output 36, resistor 94 being variable to adjust for tolerances in zener diode 84. Resistor 98 is also variable and the moving arm 102 thereof is coupled to the grid 86 through a fixed resistor 104, which is used to isolate the grid from resistor 98, since this resistor is in effect a potentiometer control and may be located remotely from the power supply for control of output potential. Resistors 94–100 are of such values that the negative output potential at output 36, the plate potential of tube 38 and the potential across capacitor 78 are all in equilibrium at a given load current. Any ripple is coupled to the grid 86 through capacitor 90 and causes the anode 44 to respond with an almost equal and opposite cancelling signal, with the result that the output is virtually ripple free. Resistor 88 and zener diode 92 protect the grid 86 during "turn on" and "turn off" when the capacitor 90 charges and discharges. While the particular voltage regulator 12 is ideally suited for the purpose, other means of voltage regulation may be employed.

If necessary, grounded eddy current shields may be placed around the windings of transformer 14 and filter 32 to avoid interference from adjacent parts or equipment, but this may not be necessary in all applications.

The negative high potential at output 36 is ideal for klystron beam potential supply, represented by the load 106, in which ripple causes frequency modulation and drift and is therefore undesirable. Except for the specially wound transformer 14 and filter inductance 32, which can be made on conventional equipment, all components are conventional, the entire circuit being simple and compact.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A high voltage, negative polarity power supply, comprising: a low-ripple balanced transformer having a grounded core; a first primary winding and a first secondary winding on said core and having similar polarity; a second primary winding and a second secondary winding on said core and having opposite polarity; said primary windings being interconnected in parallel aiding relation and being connected to a source of power input; said secondary windings being connected in series aiding relation, whereby said transformer produces high voltage low-ripple A.C. potential; RC damping networks coupled between the ends of said secondary windings and their common center connection; rectifier means connected across said series-connected secondary windings for converting said A.C. to D.C.; a grounded core balanced filter having a first inductance winding connected in series between the negative side of said rectifier means and a negative output terminal, and a second inductance winding connected in series between the positive side of said rectifier means and a positive output terminal; said inductance windings being of opposite polarity; a capacitor coupled across the output terminals of said inductance windings; a high voltage output connected to said negative output terminal; both positive and negative sides of the power supply being electrically insulated from ground; voltage regulating means connected between said positive output terminal and ground; and a load connected between said high voltage output and ground.

2. A high voltage, negative polarity power supply, comprising: a low-ripple balanced transformer having a grounded core; a first primary winding and a first secondary winding on said core and having similar polarity; a second primary winding and a second secondary winding on said core and having opposite polarity; said primary windings being interconnected in parallel aiding relation and being connected to a source of power input; said secondary windings being connected in series aiding relation, whereby said transformer produces high voltage low-ripple A.C. potential; rectifier means connected across said series-connected secondary windings for converting said A.C. to D.C.; a grounded core balanced filter having a first inductance winding connected in series between the negative side of said rectifier means and a negative output terminal, and a second inductance winding connected in series between the positive side of said rectifier means and a positive output terminal; said inductance windings being of opposite polarity; a capacitor coupled across the output terminals of said inductance windings; a high voltage output; a final filter having an inductance winding connected in series between said negative output terminal and said high voltage output; a capacitor coupling said positive output terminal to a point between said final filter and said high voltage output; both positive and negative sides of the power supply being electrically insulated from ground; voltage regulating means connected between said positive output terminal and ground; and a load connected between said high voltage output and ground.

3. A high voltage, negative polarity power supply, comprising: a low-ripple balanced transformer having a grounded core; a first primary winding and a first secondary winding on said core and having similar polarity; a second primary winding and a second secondary winding on said core and having opposite polarity; said primary windings being interconnected in parallel aiding relation and being connected to a source of power input; said secondary windings being connected in series aiding relation, whereby said transformer produces high voltage low-ripple A.C. potential; RC damping networks coupled between the ends of said secondary windings and their common center connection; rectifier means connected across said series-connected secondary windings for converting said A.C. to D.C.; a grounded core balanced filter having a first inductance winding connected in series between the negative side of said rectifier means and a negative output terminal, and a second inductance winding connected in series between the positive side of said rectifier means and a positive output terminal; said inductance windings being of opposite polarity; a capacitor coupled across the output terminals of said inductance windings; a high voltage output; a final filter having an inductance winding connected in series between said negative output terminal and said high voltage output; a capacitor coupling said positive output terminal to a point between said final filter and said high voltage output; both positive and negative sides of the power supply being electrically insulated from ground; voltage regulating means having one terminal thereof connected to said positive output terminal; and a load connected between said high voltage output and the other terminal of said voltage regulating means.

4. A power supply according to claim 3, wherein said first secondary winding is started at the finish of said first primary winding and wound in a common direction therewith; said second secondary winding being started at the finish of said second primary winding and wound in the opposite direction thereto; the ends of like polarity of said primary windings being interconnected; and one end of said first secondary winding being connected to the end of opposite polarity of said second secondary winding.

5. A low-ripple, floating power D.C. supply, comprising: a transformer having a first primary winding and a first secondary winding of similar polarity, and having a second primary winding and a second secondary winding of opposite polarity, said primary windings being connected in parallel aiding relation and said secondary windings being connected in series aiding relation, whereby the inherent stray and distributed capacities between said windings tend to be minimized and balanced; means for converting the A.C. output from said composite secondary winding to D.C. energy, said means comprising a balanced rectifier connected across the ends of the composite secondary winding, whereby said rectifier has a negative output terminal and a positive output terminal; balanced filtering choke means for further reducing ripple in a balanced manner, said filtering choke means comprising a first inductance having one end thereof connected to said negative output terminal of said rectifier, and a second inductance having one end thereof connected to said positive output terminal of said rectifier; a load; a connection between the other end of one of said inductances and one end of said load; and a regulator circuit connected between the other end of said load and the other end of said other inductance, whereby any residual ripple is further minimized by said regulator circuit.

6. A low-ripple, floating power D.C. supply, comprising: a transformer having a first primary winding and a first secondary winding of similar polarity, and having a second primary winding and a second secondary winding of opposite polarity, said primary windings being connected in parallel-aiding relation and said secondary windings being connected in series-aiding relation, whereby the inherent stray and distributed capacities between said windings tend to be minimized and balanced; means for damping harmonic oscillations produced in said secondary windings, said means comprising a series-connected resistance-capacitance network connected across each said secondary winding; means for converting the A.C. output from said secondary winding to D.C. energy, said means comprising a balanced rectifier connected across the ends of the composite secondary winding, whereby said rectifier has a negative output terminal and a positive output terminal; balanced filtering choke means for further reducing ripple in a balanced manner, said filtering choke means comprising a first inductance and a second inductance mounted on a common core, one end of said first inductance being connected to said negative output terminal of said rectifier, and one end of said second inductance being connected to said positive output terminal of said rectifier; a load having one end grounded; a third inductance connected between the other end of said first inductance and the ungrounded end of said load; and a regulator circuit connected between ground and the other end of said second inductance, whereby any residual ripple is further minimized, said load and said regulator circuit being grounded while said power supply is not grounded.

References Cited by the Examiner
UNITED STATES PATENTS

| | | | |
|---|---|---|---|
| 1,504,276 | 8/24 | Shackelton | 336—69 |
| 1,827,191 | 10/31 | Casper | 336—69 |
| 2,291,069 | 7/42 | Brown | 321—9 |
| 2,546,657 | 3/51 | Smoot | 336—30 X |
| 2,564,221 | 8/51 | Hornfeck | 336—30 |
| 2,568,587 | 8/51 | MacGeorge | 336—136 |
| 2,878,441 | 3/59 | Rogers et al. | 323—44 |
| 2,891,214 | 6/59 | Rogers et al. | 323—44 |
| 2,895,059 | 7/59 | Bell | 321—9 X |
| 2,914,719 | 11/59 | Walton et al. | 321—8 |
| 3,037,159 | 5/62 | Brown | 321—18 |

LLOYD McCOLLUM, *Primary Examiner.*

SAMUEL BERNSTEIN, MILTON O. HIRSHFIELD,
*Examiners.*